(12) United States Patent
Durocher et al.

(10) Patent No.: US 10,480,452 B2
(45) Date of Patent: *Nov. 19, 2019

(54) TEC MIXER WITH VARIABLE THICKNESSES

(71) Applicant: PRATT & WHITNEY CANADA CORP., Longueuil (CA)

(72) Inventors: Eric Durocher, Vercheres (CA); Guy Lefebvre, St-Bruno de Montarville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,189

(22) Filed: Dec. 13, 2018

(65) Prior Publication Data

US 2019/0120170 A1  Apr. 25, 2019

Related U.S. Application Data

(62) Division of application No. 13/621,467, filed on Sep. 17, 2012, now Pat. No. 10,190,536.

(51) Int. Cl.
*F02K 1/48* (2006.01)
*B21D 53/92* (2006.01)

(52) U.S. Cl.
CPC ............... *F02K 1/48* (2013.01); *B21D 53/92* (2013.01); *Y10T 29/49323* (2015.01)

(58) Field of Classification Search
CPC ..... F02K 1/48; F02K 1/50; F02K 1/46; F02K 1/386; F02K 1/78; F02K 1/80; F02K 1/822; F02K 1/825; B23P 15/04; B23P 2700/13; B64D 33/04; B64D 33/006; B23K 2101/185
See application file for complete search history.

(56) References Cited

U.S. PATENT DOCUMENTS

| 464,403 | A | * | 12/1891 | Turpin | ..................... B21D 5/08 72/168 |
|---|---|---|---|---|---|
| 3,053,340 | A | | 9/1962 | Kutney | |
| 3,730,292 | A | | 5/1973 | MacDonald | |
| 3,861,140 | A | | 1/1975 | Krabacher | |
| 4,302,934 | A | | 12/1981 | Wynosky et al. | |
| 4,335,801 | A | | 6/1982 | Stachowiak et al. | |
| 4,576,002 | A | | 3/1986 | Mavrocostas | |
| 4,786,016 | A | | 11/1988 | Presz et al. | |
| 4,813,230 | A | | 3/1989 | Braithwaite | |

(Continued)

OTHER PUBLICATIONS

Head et al., "Hot-Flow Tests of a Series of 10-Percent Scale Turbofan Forced Mixing Nozzles" [Jan. 1984], NASA, Technical Paper 2268.

(Continued)

*Primary Examiner* — Jason H Duger
(74) *Attorney, Agent, or Firm* — Norton Rose Fulbright Canada L.L.P.

(57) ABSTRACT

A mixer of a bypass turbine aeroengine according to one embodiment, includes circumferential inner and outer flow surfaces in a wavy configuration to form a plurality of lobes of the mixer. The mixer has an upstream end portion of sheet metal with a first thickness and a downstream end portion of sheet metal with a second thickness less than the first thickness.

6 Claims, 4 Drawing Sheets

(56) References Cited

U.S. PATENT DOCUMENTS

| | | | |
|---|---|---|---|
| 4,819,425 A | | 4/1989 | Farquhar et al. |
| 4,909,346 A | | 3/1990 | Torkelson |
| 5,265,807 A | | 11/1993 | Steckbeck et al. |
| 5,761,900 A | | 6/1998 | Presz |
| 5,884,472 A | * | 3/1999 | Presz, Jr. .................. F02K 1/36 239/265.17 |
| 6,233,920 B1 | | 5/2001 | Presz, Jr. et al. |
| 6,285,442 B1 | * | 9/2001 | Sato .................... G03F 7/70083 355/53 |
| 6,786,037 B2 | | 9/2004 | Balzer |
| 6,935,098 B2 | | 8/2005 | Bardagi et al. |
| 7,017,331 B2 | | 3/2006 | Anderson |
| 7,043,898 B2 | | 5/2006 | Rago |
| 7,100,358 B2 | | 9/2006 | Gekht et al. |
| 7,251,927 B2 | | 8/2007 | Anderson |
| 7,434,384 B2 | | 10/2008 | Lord et al. |
| 7,882,696 B2 | | 2/2011 | Anderson et al. |
| 8,408,011 B2 | | 4/2013 | Fontaine et al. |
| 8,443,515 B2 | | 5/2013 | Morenko et al. |
| 8,739,513 B2 | | 6/2014 | Lefebvre et al. |
| 9,249,755 B2 | * | 2/2016 | Szydlowski ........... A45D 34/00 |
| 2004/0068981 A1 | | 4/2004 | Siefker et al. |
| 2010/0005780 A1 | | 1/2010 | Philippe et al. |
| 2011/0036068 A1 | | 2/2011 | Lefebvre et al. |
| 2011/0126512 A1 | | 6/2011 | Anderson |

OTHER PUBLICATIONS

Mengle et al., "Lobed Mixer Design for Noise Suppression Acoustic and Aerodynamic Test Data Analysis (2002)", NASA, NASA/CR-2002-210823/vol. 1.

* cited by examiner

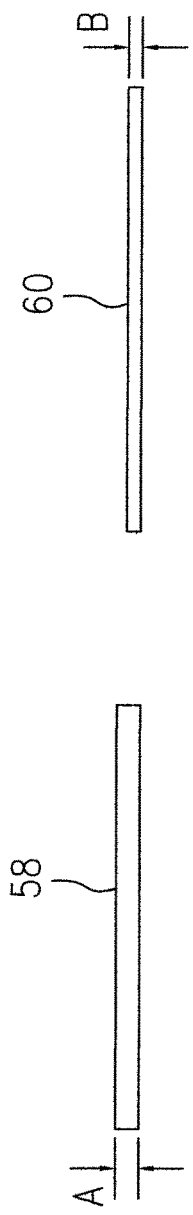
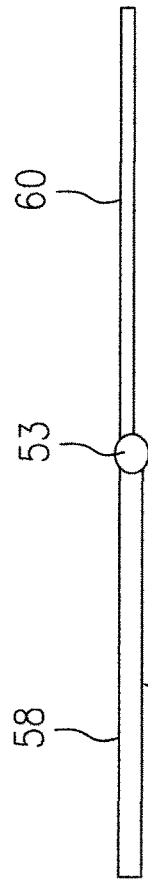
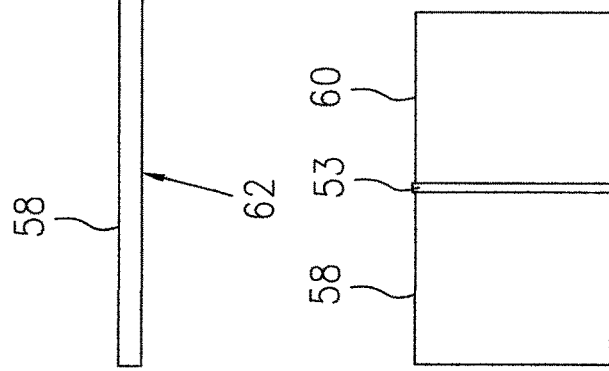
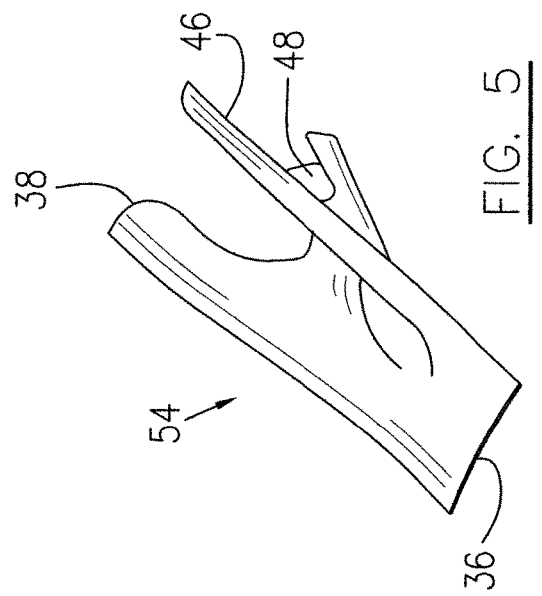

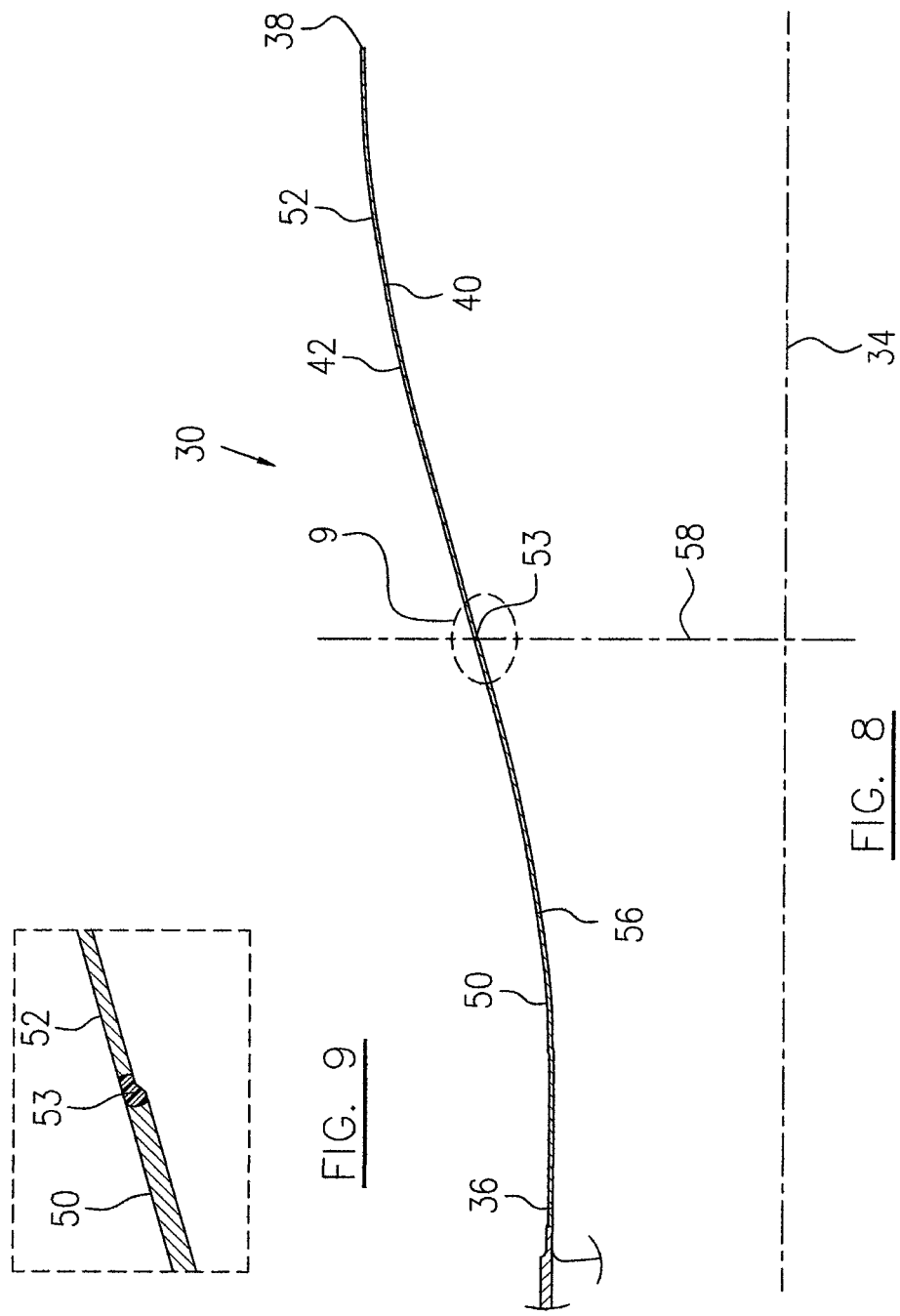

TEC MIXER WITH VARIABLE THICKNESSES

CROSS-REFERENCE TO RELATED APPLICATIONS

This application is a divisional of U.S. application Ser. No. 13/621,467, filed Sep. 17, 2012, the entire contents of which are incorporated by reference herein.

TECHNICAL FIELD

The application relates generally to gas turbine aeroengines and, more particularly, to an improved turbine exhaust case mixer for such engines.

BACKGROUND OF THE ART

In order to increase the effective thrust of turbojet engines, bladed fans have been added to a turbine driven shaft thereof to effect the flow of a quantity of atmospheric air through an annular bypass duct surrounding the turbojet. Hot gases from the core engine and the bypass air stream are mixed together before expulsion through a single nozzle. In order to perform the mixing function, turbine exhaust case (TEC) mixers have been devised which include circumferential inner and outer flow surfaces extending between upstream and downstream ends of the mixer. The inner and outer flow surfaces have a twist extending toward the downstream end to form a plurality of lobes of the mixer, each of the lobes defining an internal passageway along the inner flow surface for the exhaust gases flowing through the mixer and each pair of adjacent lobes defining therebetween an external passageway along the outer flow surface for the bypass air stream. In order to maintain the strength of the mixer while minimizing its weight, it has become common practice to form the mixer from a single sheet of structural material. However, stiffener rings may be required on the mixer in order to restrain its end motion when the mixer is directly welded on the outer duct of a TEC, particularly in large sized turbine machinery engines, in an effort to avoid durability issues due to mixer vibratory responses.

Accordingly, there is a need to provide an improved TEC mixer.

SUMMARY

In one aspect, there is provided a mixer of a bypass turbine aeroengine for mixing exhaust gases discharged from a turbine exhaust case, with a bypass air stream, the mixer defining a central axis extending between an upstream end and a downstream end and comprising circumferential inner and outer flow surfaces extending between the upstream and downstream ends of the mixer, the inner and outer flow surfaces having a wavy configuration extending toward the downstream end to form a plurality of lobes of the mixer, each of the lobes defining an internal passageway along the inner flow surface for the exhaust gases flowing through the mixer and each pair of adjacent lobes defining therebetween an external passageway along the outer flow surface for the bypass air stream flowing through the mixer, the mixer having a circumferentially-endless upstream portion of sheet metal with a first thickness, a circumferentially-endless downstream portion of sheet metal with a second thickness less than the first thickness, and a weld joint extending circumferentially between and joining the circumferentially-endless upstream and downstream portions together.

In another aspect, there is provided method for making a mixer of a bypass turbine aeroengine, the mixer defining a central axis extending between an upstream end and a downstream end and having circumferential inner and outer flow surfaces extending between the upstream and downstream ends of the mixer, the inner and outer flow surfaces having a wavy configuration extending toward the downstream end to form a plurality of lobes of the mixer, each of the lobes defining an internal passageway along the inner flow surface for exhaust gases flowing through the mixer and each pair of adjacent lobes defining therebetween an external passageway along the outer flow surface for a bypass air stream, the method comprising: a) preparing a first group of sheet metal blanks having a first thickness and a second group of sheet metal blanks having a second thickness less than the first thickness of the first group of sheet metal blanks; b) welding each one of the first group of sheet metal blanks to one of the second group of sheet metal blanks to thereby form a plurality of integrated blank-pieces each having a first portion thicker than a second portion; c) shaping the respective integrated blank-pieces into substantially identical circumferential segments of the mixer, each circumferential segment of the mixer including a section of the upstream end of the mixer formed with the first portion of one integrated blank-piece and a section of the downstream end of the mixer formed with the second portion of said one integrated blank-piece; and d) welding together the plurality of circumferential segments in a circumferential array to form the mixer in a complete configuration of a nozzle.

Further details of these and other aspects of the described subject matter will be apparent from the detailed description and drawings included below.

DESCRIPTION OF THE DRAWINGS

Reference is now made to the accompanying figures in which:

FIG. 2 is a side elevational view of two sheet metal blanks to be used for making a circumferential segment of a mixer according to one embodiment;

FIG. 3 is a side elevational view of the two sheet metal blanks of FIG. 2 welded together to form an integrated blank-piece;

FIG. 4 is a top plan view of the integrated blank-piece of FIG. 3;

FIG. 5 is a perspective view of a circumferential segment of a mixer according to one embodiment;

FIG. 8 is a partial cross-sectional view of the mixer of FIG. 7 welded to the turbine exhaust case, shown in a cross-sectional plane of the mixer determined by a central axis of the mixer and one of axial weld joints extending between a pair of adjacent circumferential segments of the mixer; and FIG. 9 is an enlarged portion of the circled area indicated by numeral 9 in FIG. 8, showing a weld joint extending circumferentially between and joining the circumferentially-endless upstream and downstream portions of the mixer.

It will be noted that throughout the appended drawings, like features are identified by like reference numerals.

DETAILED DESCRIPTION

Figure 1:
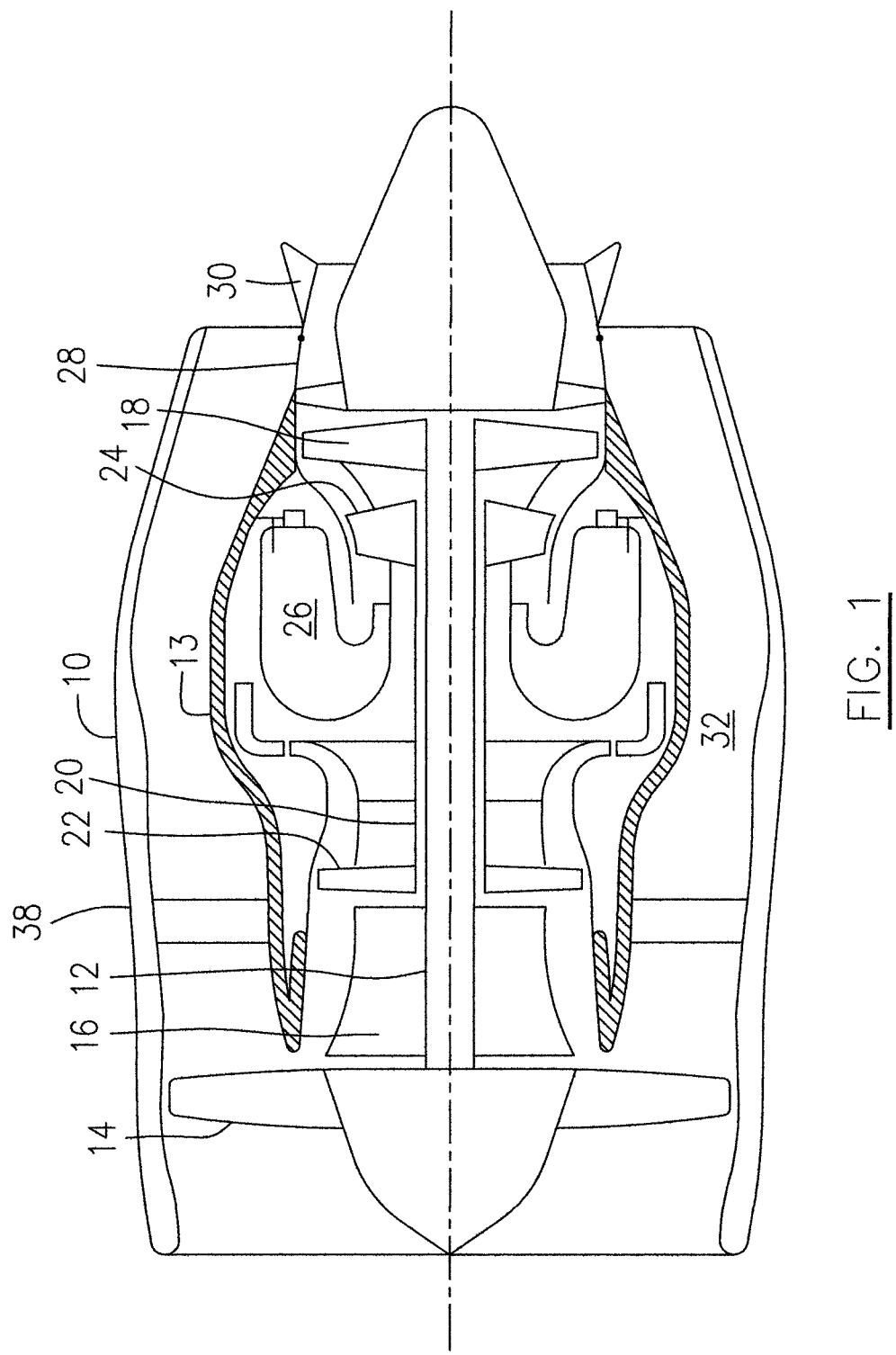
FIG. 1 is a an exemplary bypass turbine aeroengine showing an application of the described subject matter according to one embodiment.
Figure 7:
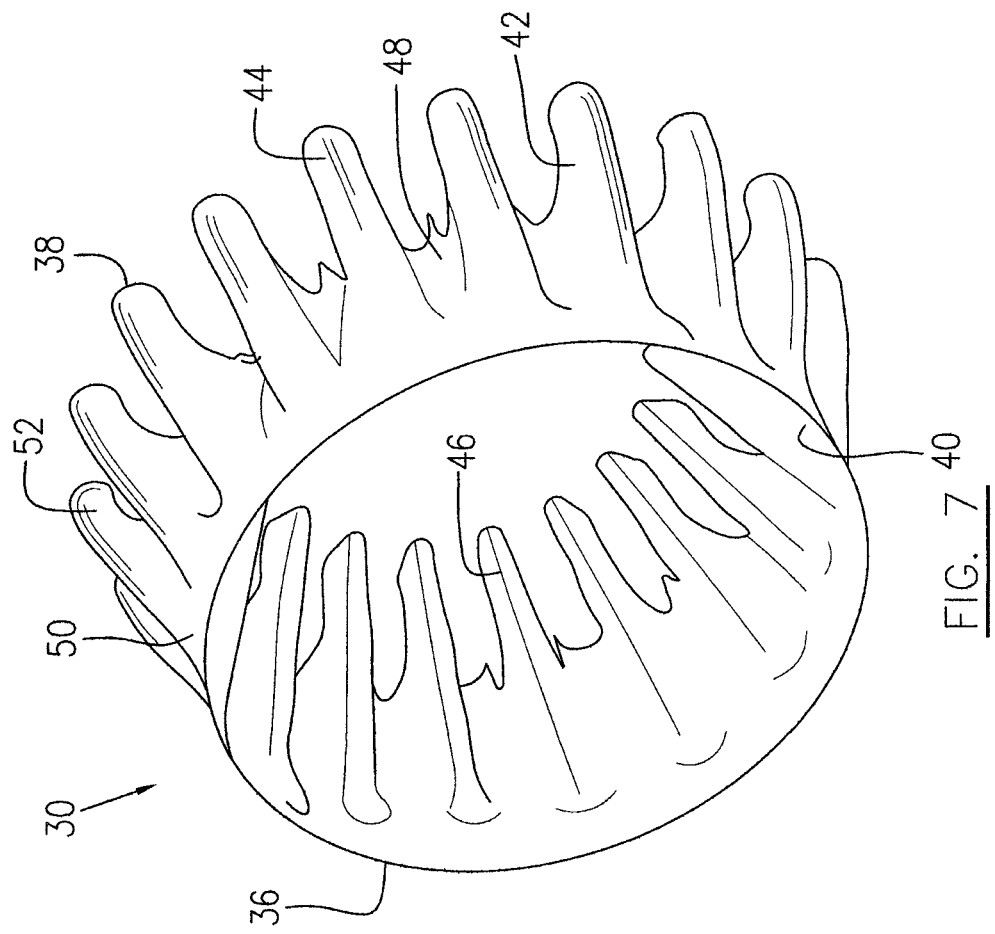
FIG. 7 is a perspective view of a complete configuration of the mixer according to one embodiment.

FIG. 1 illustrates an exemplary bypass turbine aeroengine which includes a nacelle configuration 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assembly 12 and 20 in order to define a main fluid path (not indicated) therethrough. In the main fluid path there is provided a combustion chamber 26 in which a combustion process produces combustion gases to power the high and low turbine assemblies 24 and 18. A turbine exhaust case (TEC) 28 is provided to form a downstream end of the core casing 13 and a mixer 30 is attached to the downstream end of the TEC 28 for mixing hot exhaust gases discharged from the high and low turbine assemblies 24, 18 through the main fluid path with a bypass air stream driven by the fan assembly 14 through an annular bypass duct 32 which is defined radially between the nacelle configuration 10 and the core casing 13.

Referring to FIGS. 1 and 7-9, the mixer 30 defines a central axis 34 and is formed with a nozzle configuration around the central axis 34 which extends between an upstream end 36 and a downstream end 38 of the mixer 30, and substantially superposes the central rotation axis (not numbered) of the aeroengine, as shown in FIG. 1. The mixer 30 includes circumferential inner and outer flow surfaces 40, 42 extending between the upstream and downstream ends 36, 38 of the mixer 30. The inner and outer flow surfaces 40, 42 are in a wavy or twisted configuration (not numbered) extending toward the downstream end 38, to form a plurality of lobes 44 of the mixer 30. Each of the lobes 44 defines an internal passageway 46 along the inner flow surface 40 for the exhaust gases which are discharged from the TEC 28 of the aeroengine to flow through the mixer 30. Each pair of adjacent lobes 44 define therebetween an external passageway 48 along the outer flow surface 42 for the bypass air stream coming from the annular bypass air duct 32 to flow through the mixer 30. Therefore, the internal and external passageways 46, 48 in combination establish a vortex system downstream of the mixer 30 to encourage mixing between the bypass air stream and the turbine exhaust gases during operation of the aeroengine.

In one embodiment, the mixer 30 may include a circumferentially-endless upstream portion 50 of sheet metal and a circumferentially-endless downstream portion 52 of sheet metal, as shown in FIG. 8. A weld joint 53 extending circumferentially between the circumferentially-endless upstream and downstream portions 50, 52 joins the same together, thereby forming the nozzle configuration of the mixer 30. The sheet metal of the circumferentially-endless upstream portion 50 is thicker than the sheet metal of the downstream portion 52, as more clearly shown in FIG. 9.

Referring to FIGS. 1, 5-8 and according to one embodiment, the mixer 30 may include a plurality of substantially identical circumferential segments 54. Each of the circumferential segments 54 may include both a circumferential section of the circumferential-endless upstream portion 50 and a circumferential section of the circumferentially-endless downstream portion 52, and therefore each circumferential segment 54 has a sheet metal structure thicker in an area near the upstream end 36 than an area near the downstream end 38. The plurality of circumferential segments 54 are joined together by a plurality of weld joints 56, to form the nozzle configuration of the mixer 30. Each of the weld joints 56 joins a pair of adjacent circumferential segments 54 and in combination with the central axis 34 of the mixer 30 determines an axial cross-sectional plane of the mixer 30, as represented in FIG. 8 as the planer surface of the drawing sheet.

The circumferentially extending weld joints 53 may substantially determine a radial cross-sectional plane substantially normal to the central axis 34 of the mixer 30, as indicated by line 58 in FIG. 8.

In one embodiment, each of the circumferential segments 54 may include one complete external passageway 48 as illustrated in FIG. 5. Alternatively a circumferentially-larger circumferential segment may include more than one complete external passageway, for example similar to one presented in FIG. 6 which includes three complete external passageways 48. However, the circumferentially-larger circumferential segment could be formed with three circumferential segments 54 of FIG. 5.

Figure 6:
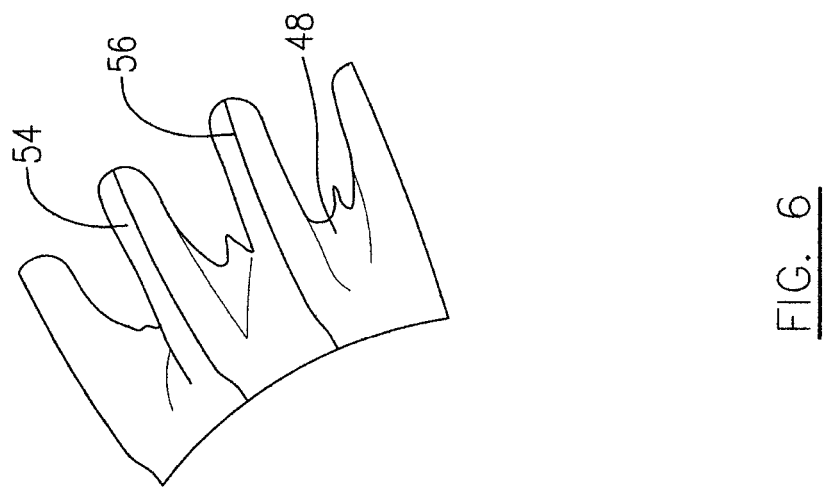
FIG. 6 is a perspective view of three circumferential segments of the mixer welded together in a process of the mixer fabrication, according to one embodiment.

In the above-embodiments shown in FIGS. 5 and 6, the opposed side edges (not numbered) of each circumferential segment 54 may be formed on incomplete internal passageways 46, and the circumferential segment 54 may include a complete external passageway 48. In contrast to these embodiments, each of circumferential segments may have opposed side edges formed of incomplete external passageways 48 (not shown) such that this circumferential segment could include at least one complete internal passageway 46.

It should be noted that in contrast to a progressively wavy or twisted configuration of the downstream end 38 of the mixer 30, the upstream end 36 of the mixer 30 has a substantially smoothly round or un-twisted configuration in order to provide an interface fitting with the downstream end (not numbered) of an outer duct of the TEC 28.

A method of fabricating such a mixer 30 with variable thicknesses is further described below.

Referring to FIGS. 2-9, the mixer 30 may be fabricated with two groups of sheet metal blanks 58 and 60. The sheet metal blank 58 has a thickness A, greater than a thickness B of the sheet metal blank 60. The respective sheet metal blanks 58, 60 may be in a square or rectangular shape. Each pair of sheet metal blanks 58 and sheet metal blanks 60 may be placed one adjacent another in an end-to-end pattern and then in a welding process, the weld joint 53 may be applied along the interface of the sheet blanks 58 and 60, thereby forming an integrated blank-piece 62 including the thicker sheet metal blank 58 and the thinner sheet metal blank 60. The sheet metal blanks 58 in the first group may be substantially identical, and the sheet blanks 60 in the second group may be substantially identical, and therefore the plurality of integrated blank-pieces 62 will be substantially identical. The respective sheet metal blanks 58, 60 may have a substantially similar width such that each of the integrated blank-pieces 62 formed by a pair of sheet metal blanks 58, 60 may have substantially straight side edges, as shown in FIG. 4. Each of the integrated blank pieces may therefore be a rectangular or square shape. The length of the respective sheet metal blanks 58 and 60 may differ, depending on required area ratios between the relatively thick sheet metal blank 58 and the relatively thin sheet metal blank 60.

A blending process may be conducted to blend the weld joint 53 in order to provide a smooth transition between the surfaces of the respective sheet metal blank 58 and sheet metal blank 60 on both sides of the integrated blank-piece 62. In a shaping process, the respective integrated blank-pieces 62 may be shaped for example by a pressing machine, into substantially identical circumferential segments 54, as shown in FIG. 5. Such a circumferential segment 54 includes a section of the upstream end 36 of the mixer 30 formed by the thick portion of one integrated blank-piece 62 (the portion formed by the thick sheet metal blank 58) and a section of the downstream end 38 of the mixer 30 formed by the thin portion of the same integrated blank piece 62 (the portion formed by thin sheet metal blank 60). The shaping process conducted by the pressing machine may include both a pressing step for shaping the wavy or twisted configuration and a cutting step for cutting edges of the integrated blank-piece 62.

As already described, the shaped circumferential segment 54 may include at least one of a complete internal passageway 46 and a complete external passageway 48 but it should be understood that a single integrated blank-piece 62 may have a circumferential dimension large enough to shape a relatively large circumferential segment in order to include more than one external passageway 48 or more than one internal passageway 46. In such a case, the sheet metal blanks 58 in the first group and the sheet metal blanks 60 in the second group and thus formed integrated blank-piece 62, may be prepared with relatively wide dimensions.

In a welding process the circumferential segments 54 are welded together in a circumferential array to form the mixer 30 in a complete configuration of a nozzle. In such a welding process, each of the weld joints 56 are applied along the interface of two facing side edges of a pair of adjacent circumferential segments 54. It may be convenient for access in the welding process, if the interface of two facing side edges of the adjacent circumferential segments 54 is positioned on the internal passageway 46 (as shown in FIGS. 5 and 6) rather than on the external passageway 48 because the external passageway 48 is radially inwardly recessed at the downstream portion of the mixer 30, and is less convenient for access with respect to access to the radially outwardly projecting internal passageway 46.

Prior to welding the complete mixer 30 to the TEC 28, the upstream end 36 of the complete mixer 30 may be cut and blended for a uniform face ready to be welded to an outer duct of the TEC 28 of the aeroengine. The mixer 30 fabricated according to the above-described embodiments has a relatively simple design architecture and saves manufacturing costs. The mixer 30 having variable thicknesses, provides enhanced rigidity while remaining relatively light weight and therefore may be attached to the TEC of the aeroengine by a single weld joint along the upstream end of the mixer 30 without additional support, resulting in reduced part count on the TEC assembly.

The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A method for making a mixer of a bypass turbine aeroengine, the mixer defining a central axis and extending between an upstream end and a downstream end, the mixer having a circumferentially endless upstream portion including the upstream end, a circumferentially endless downstream portion including the downstream end and having circumferential inner and outer flow surfaces extending between the upstream end and the downstream end; the inner and outer flow surfaces having a wavy configuration extending downstream from a location in the circumferentially endless upstream portion and terminating at the downstream end to form a plurality of lobes of the mixer, each of the lobes defining an internal passageway along the inner flow surface for exhaust gases flowing through the mixer and at least one pair of adjacent ones of the plurality of lobes defining therebetween an external passageway along the outer flow surface for a bypass air stream, the method comprising:
   a) preparing a first group of sheet metal blanks having a first thickness and a second group of sheet metal blanks having a second thickness, the first thickness and the second thickness being respectively constant along an entire length of the sheet metal blanks of the first group and the sheet metal blanks of the second group;
   b) welding each one of the sheet metal blanks of the first group to one of the sheet metal blanks of the second group to thereby form a plurality of integrated blank-pieces each having a first portion of the first thickness and a second portion of the second thickness;
   c) shaping each of the plurality of integrated blank-pieces into respective circumferential segments of the mixer; and
   d) welding together the respective circumferential segments in a circumferential array to form the mixer in a complete configuration of a nozzle with the first thickness being constant along an entire length of the circumferentially endless upstream portion and with the second thickness second thickness being less than the first thickness.

2. The method as defined in claim 1 wherein the external passageway is included in one of the respective circumferential segments and/or one of the internal passageways defined by each of the plurality of lobes is included in said one of the respective circumferential segments.

3. The method as defined in claim 1 wherein the external passageway is included in one of the respective circumferential segments.

4. The method as defined in claim 1 wherein each of the plurality of integrated blank-pieces prior to the shaping c) is in a rectangular or square shape.

5. The method as defined in claim 4 further comprising: cutting and blending the upstream end to provide a uniform face ready to be welded to a turbine exhaust case of the aeroengine.

6. The method as defined in claim 1 further comprising between the welding b) and the shaping c), blending a weld joint on each of the plurality of integrated blank-pieces.

\* \* \* \* \*